Patented Oct. 7, 1952

2,613,170

UNITED STATES PATENT OFFICE 2,613,170

CALCIUM SULFANILAMIDE PREPARATIONS

Simon L. Ruskin, New York, N. Y., assignor to Physiological Chemicals Company, New Rochelle, N. Y., a corporation of New York No Drawing. Application March 2, 1944, Serial No. 524,781

15 Claims. (Cl. 167—51.5)

The present invention relates to therapeutic preparations for the treatment of various upper respiratory infections, and more particularly to preparations of this kind having both a bactericidal and vaso-constricting action.

More specifically the invention relates to preparations containing a calcium salt of a sulfanilamide together with a vaso constrictor and adapted for use, as by spraying, on the mucosa of the upper respiratory channels.

The present application is a continuation-in-part of my copending application Serial No. 498,590, filed August 13, 1943.

The desirability of employing a bactericide along with a vaso constrictor for application to the passages of the upper respiratory tract has already been recognized. Sulfanilamide and its various $N^1$-cyclic substituted derivatives do not lend themselves for use as the bactericide in such a composition because of their low solubility or insolubility in water. On the other hand, the sodium salts of the sulfanilamides, while they possess the necessary water-solubility, have the serious disadvantage that they are quite caustic and strongly irritate the delicate mucous membranes of the nose and throat passages. Sulfanilamide and its organically substituted derivatives, and the sodium compounds of these substances therefore represent unsatisfactory bactericides for use on sensitive mucous membranes either because of their very low water solubility, or because of their irritating action.

It is the primary object of the invention to provide a medicament for use in the upper respiratory passages which possesses a vaso constricting and at the same time a strong bactericidal action, but substantially free from irritating or painful effects on sensitive tissues.

It is also an object of the invention to provide a composition of the type indicated which is stable over long periods of time, and thus retains its vaso constrictor and bactericidal action quite indefinitely. Other objects of the invention will appear as the more detailed description of the invention proceeds.

The calcium compounds of the sulfanilamides are of relatively low solubility in water and such fact, together with the known fact that calcium compounds of complex organic substances are frequently if not usually unstable in aqueous solution, especially when such solutions contain also other complex organic substances, would appear to mark such calcium compounds as unsuitable for use in an aqueous spray, together with an organic vaso constrictor, for the treatment of upper respiratory infections. I have, however, found that the calcium salts of the sulfanilamides are sufficiently soluble in water to exert a strong bactericidal action, while being at the same time substantially free from any irritating action on the sensitive membranes of the upper respiratory passages; and further, that where solutions of such calcium compounds with a vaso constrictor are unstable and tend to precipitate, they can be rendered stable for indefinite periods in a simple and inexpensive manner.

According to the invention, therefore, stable and non-caustic solutions having an adequate bactericidal and vaso constricting action are prepared by the use of the calcium salts of the sulfa drugs, such as the calcium compounds of sulfanilamide, sulfathiazole, sulfadiazine, and sulfamerazine, together with a vaso constrictor, preferably desoxyephedrine. Solutions of this type, as I have found, can be freely used in the nasal and throat passages without irritation and without danger of sloughing of the delicate membranes.

Aqueous solutions containing 1 or 2% of the calcium sulfa compound and a smaller quantity of desoxyephedrine, for example, 0.1 to 0.2% can accordingly be prepared in accordance with the present invention which have a pH value no higher than about 8.5, and essentially no higher than 8, which solutions are non-irritating even to delicate membranes. These small amounts of calcium sulfa compound and a vaso-constrictor are sufficient to produce adequate antisepsis and vaso-constriction so that a rapid healing action is induced. Where the solutions are freshly made up, they can be used without further modifications; I have, however, found that, for example, solutions of calcium sulfathiazole and desoxyephedrine tend to precipitate on standing longer than about a week. In a further development of the invention, these solutions are rendered stable over indefinite periods by the addition thereof of small quantities of relatively highly soluble calcium salts, like calcium chloride or bromide. The amount necessary to effect stability is extremely small, several hundredths of 1% being usually sufficient. The calcium halogenides, in addition to stabilizing this solution are of further advantage by reason of the fact that they are themselves acidic in character, so that they tend to reduce the basicity of the calcium sulfa drug solution. In place of the calcium halogenides, calcium saccharate or other soluble organic calcium salt may be employed; if desired, dextrose in an amount corresponding to about 5% of the solution may be used. None of these stabilizing agents, it will be noted, reacts with the calcium sulfa drug to form an insoluble compound.

The following example illustrates a satisfactory manner of compounding the therapeutic agent in accordance with the invention. It will be understood that the proportions given are illustrative only and may be varied without departing from the spirit of the invention:

Twenty grams of calcium sulfathiazole are stirred in a liter of distilled water until a clear solution is obtained. To this solution is added 0.33 gram of calcium chloride. One gram of desoxyephedrine solution is now added and the entire solution stirred for five minutes. The resultant solution is ready for use, and may be stored in well stoppered bottles. The solution is preferably applied in the form of a spray in the nasal and throat passages.

In similar fashion solutions of calcium sulfanilamide, calcium sulfadiazine and calcium sulfamarazine with suitable amounts of desoxyephedrine or other compatible vaso constrictor may be prepared, with or without one of the stabilizing agents referred to above.

Among the other vaso constrictors that can be employed are ephedrine base or adrenaline base, in the amount of about 0.1%.

Other vaso constrictors not incompatible with the calcium sulfa drug solution can likewise be used.

I claim:

1. A therapeutic composition comprising an aqueous solution containing a calcium compound of a sulfanilamide, desoxyephedrine, and an effective quantity but less than 1% of calcium chloride as a stabilizing agent.

2. A composition as defined in claim 1 wherein the calcium compound is calcium sulfanilamide.

3. A composition as defined in claim 1 wherein the calcium compound is calcium sulfathiazole.

4. A composition as defined in claim 1 wherein the calcium compound is a calcium sulfapyrimidine.

5. A composition as defined in claim 1 wherein the calcium compound is calcium sulfadiazene.

6. A therapeutic composition suitable for application to the respiratory passages and containing a calcium compound of a sulfanilamide having an anti-bacterial action, desoxyephedrine base, and a small proportion of calcium chloride.

7. A therapeutic composition containing a calcium compound of a sulfanilamide having an anti-bacterial action, together with calcium chloride as a stabilizing agent, all in aqueous solution.

8. A therapentic composition containing a calcium compound of sulfathiazole, together with a small proportion of calcium chloride as a stabilizing agent, all in aqueous solution.

9. A therapeutic composition suitable for application to the respiratory passages and containing a calcium compound of a sulfanilamide having an anti-bacterial action, a member of the group consisting of desoxyephedrine, ephedrine and adrenaline, and a small proportion of calcium chloride.

10. A therapeutic composition comprising an aqueous solution containing a calcium compound of a sulfanilamide having an anti-bacterial action, a member of the group consisting of desoxyephedrine, ephedrine and adrenaline, and an effective quantity but less than one percent of calcium chloride as a stabilizing agent.

11. A composition as defined in claim 10 wherein the calcium compound is calcium sulfathiazole.

12. A stable therapeutic composition suitable for application to the respiratory passages and comprising an aqueous solution containing about 1 to 5% of a calcium compound of a sulfanilamide, about 0.1 to 0.2% of desoxyephedrine and about 0.03 to 1% of calcium chloride, said solution having a pH value in the alkaline range but no higher than 8.0, the quantity of calcium chloride being less than that of the sulfanilamide.

13. A therapeutic composition suitable for application to the respiratory passages and comprising an aqueous solution containing a calcium compound of a sulfanilamide, desoxyephedrine bsae, and calcium chloride, said solution having a pH value in the alkaline range but no higher than 8.0, the quantity of calcium chloride being less than that of the sulfanilamide.

14. A therapeutic composition comprising an aqueous solution of a calcium compound of a sulfanilamide having an anti-bacterial action, desoxyephedrine base, and as a stabilizer, a highly soluble calcium salt, said solution having a pH value in the alkaline range but no higher than 8.0, the quantity of calcium chloride being less than that of the sulfanilamide.

15. A therapeutic composition suitable for application to the respiratory passages and comprising an aqueous solution of a calcium compound of a sulfanilamide having an anti-bacterial action, desoxyephedrine base, and as a stabilizer, a calcium halogenide, said solution having a pH value in the alkaline range but no higher than 8.0, the quantity of calcium halogenide being less than that of the sulfanilamide.

SIMON L. RUSKIN.

REFERENCES CITED

The following references are of record in the file of this patent:

UNITED STATES PATENTS

| Number | Name | Date |
| --- | --- | --- |
| 1,965,535 | Pasternack | July 3, 1934 |
| 2,252,822 | Vogenthaler | Aug. 19, 1941 |
| 2,265,453 | Schmidt | Dec. 9, 1941 |
| 2,325,029 | Baker | July 24, 1943 |
| 2,361,624 | Hamilton | Oct. 31, 1944 |
| 2,369,711 | Blythe | Feb. 20, 1945 |
| 2,389,582 | Winnek | Nov. 20, 1945 |
| 2,396,711 | Lott | Mar. 19, 1946 |

FOREIGN PATENTS

| Number | Country | Date |
| --- | --- | --- |
| 111,230 | Australia | 1939 |
| 114,894 | Australia | Mar. 17, 1942 |
| 213,815 | Switzerland | June 3, 1941 |
| 683,866 | Germany | Nov. 17, 1939 |
| 839,711 | France | Jan. 7, 1939 |

OTHER REFERENCES

American Med. Assn. Journal, November 20, 1943, page 791, abstract of Nelson and Spink article.

Turnbull: Journ. A. M. A., October 30, 1943, pages 536 and 537.

Drug and Cosmetic Industry, March 1943, pages 323 to 324.

Advertising Circular "Thizodrin," Eli Lilly and Company, March 1943 (8 pages).

Jenkins: Journ. Amer. Phar. Assn. June 1938, vol. 27, pp. 484–487.

U. S. Dispensatory, 23d edition (1943), pages 230 and 231.